Patented Nov. 11, 1930

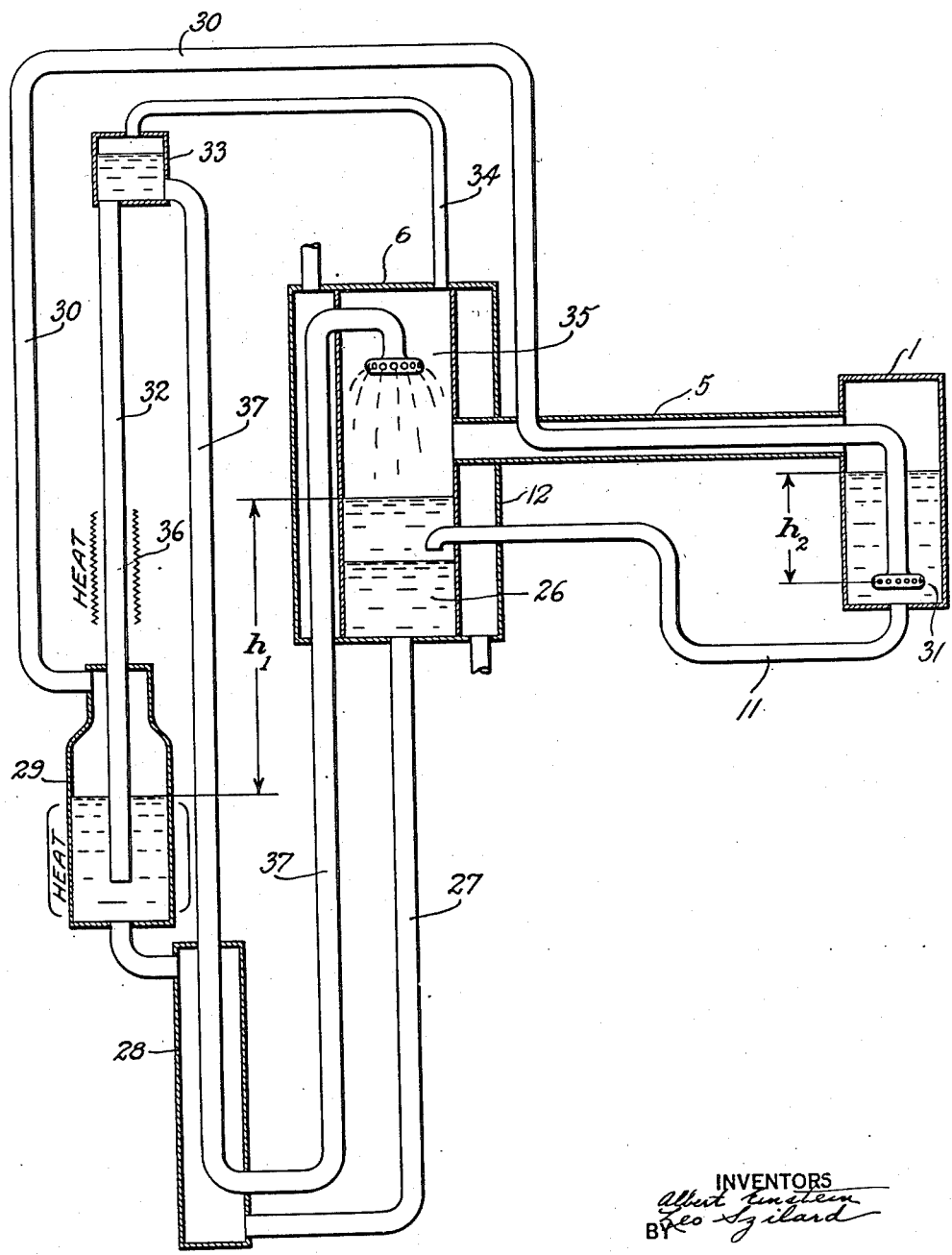

1,781,541

UNITED STATES PATENT OFFICE

ALBERT EINSTEIN, OF BERLIN, AND LEO SZILARD, OF BERLIN-WILMERSDORF, GERMANY, ASSIGNORS TO ELECTROLUX SERVEL CORPORATION, OF NEW YORK, N. Y., A CORPORATION OF DELAWARE

REFRIGERATION

Application filed December 16, 1927, Serial No. 240,566, and in Germany December 16, 1926.

Our invention relates to the art of refrigeration and particularly to an apparatus and method for producing refrigeration wherein the refrigerant evaporates in the presence of an inert gas and more particularly to the type disclosed in Patent No. 1,685,764 granted September 25th, 1928, to Von Platen and Munters and our British Patent No. 282,428.

The objects and advantages of our invention will be apparent from the following description considered in connection with the accompanying drawing which shows, more or less diagrammatically, a preferred embodiment of our invention.

Referring to the drawing, reference character 1 designates an evaporator, which is ordinarily placed within a chamber to be cooled. A conduit 5 connects the upper part of evaporator 1 with the more intermediate portion of the condenser 6. A conduit 11 communicates with the bottom of evaporator 1 and extends within condenser 6 at a level below the point of communication of conduit 5 with the condenser. A cooling water jacket 12 surrounds the condenser and is adapted for the passage therethrough of water for the purpose of cooling the condenser.

A conduit 27 communicates with the bottom of condenser 6 and with the lower part of a heat exchanger jacket 28. The upper part of jacket 28 is connected to the lower part of generator 29. Generator 29 is heated in any suitable manner. A conduit 30 communicates with the upper part of generator 29 and extends within evaporator 1 to a point near the bottom thereof where it terminates in a distributor head 31. Conduit 30 extends within conduit 5 in order that the fluids passing through the respective conduits may be brought into heat exchange relationship with each other.

A conduit 32 extends upwardly from within the lower part of generator 29 and communicates with a container 33 placed at a level above that of condenser 6. A source of heat 36 is provided for heating conduit 32 at a point above generator 29. A conduit 37 extends downwardly from container 33 and passes within heat exchanger jacket 28 and thence upwardly to within the upper part of condenser 6 where it terminates in a distributor head 35. Conduit 37 passes within cooling water jacket 12 in order that fluid passing through this conduit may be cooled. A vent conduit 34 connects the upper part of container 33 with the upper part of condenser 6.

The operation of the above described apparatus is as follows:

A suitable refrigerant, for instance butane, in liquid form is contained within evaporator 1. An inert gas, for instance ammonia, is introduced into evaporator 1 through conduit 30 and distributor head 31. The refrigerant evaporates in the evaporator in the presence of the inert gas due to the fact that the partial pressure of the refrigerant is reduced thereby and the resulting gaseous mixture passes through conduit 5 to within condenser 6. Here the mixture comes in intimate contact with an absorption liquid, for example water, which is introduced into the condenser through conduit 37 and distributor head 35. Inasmuch as the ammonia gas is very soluble in water, while the butane is quite insoluble, the ammonia gas is absorbed by the water, thus freeing the butane from the gaseous mixture. Thus the butane assumes substantially the entire pressure within the condenser, which pressure is sufficient to cause its liquefaction at the temperature maintained therein by the cooling water.

The specific gravity of liquid butane is less than that of the solution of ammonia in water and hence stratification of the two liquids occurs, the liquid butane floating upon the ammonia solution. The latter solution is indicated by reference character 26. The liquid butane passes from condenser 6 through conduit 11 and returns to evaporator 1, where it is again evaporated and the cycle repeated.

The ammonia solution flows by gravity from condenser 6 through conduit 27 and heat exchanger jacket 28 to within generator 29. Here the application of heat causes the ammonia to be expelled as a gas from the solution and this ammonia gas passes through conduit 30 and distributor head 31 to within evaporator 1, where it reduces the partial pressure of the butane, wherefore the latter evaporates as previously described.

Water, containing but little ammonia in solution, passes from generator 29 into conduit 32 where it is further heated by the source of heat 36. This heating causes the formation of vapor in conduit 32 which lifts liquid through this conduit to within container 33. The liquid thus supplied to container 33 may pass by gravity through conduit 37 to condenser 6. The hot weak liquid passing through conduit 37 is brought into heat exchange relationship with the cool strong liquid passing through heat exchanger jacket 28 and an exchange of heat between the two liquids takes place. The weak liquid is further cooled by being brought into heat exchange relation with the cooling water in jacket 12 and is hence in a condition to rapidly absorb ammonia in the condenser.

Vapor entering container 33 from conduit 32 passes therefrom through vent conduit 34 to the condenser.

During the operation of the hereinbefore described apparatus, the pressure existing in the various members is uniform with the exception of slight pressure differences, sufficient to cause flow of fluids, caused by liquid columns. The pressure existing in generator 29 must be sufficiently greater than that existing in the upper part of evaporator 1 to cause the flow of vapor to take place from distributor head 31, or, in other words, to overcome the liquid head designated by $h_2$. This excess pressure in the generator is balanced by the head exerted by the column of liquid equal to the differences in levels between the liquid in condenser 6 and generator 29, indicated by $h_1$. It is, of course, necessary that the head represented by $h_2$ is less than that represented by $h_1$ in order that flow shall take place.

While we have described a preferred embodiment for carrying out our invention, it is to be understood that modifications thereof fall within the scope of the invention, which is to be limited only by the appended claims viewed in the light of the prior art.

What we claim is:

1. Refrigerating apparatus comprising a generator, a condenser arranged at a higher level than the generator, an evaporator, a container arranged at a higher level than the condenser, said generator containing an inert gas dissolved in absorption liquid and adapted to expel the inert gas from solution, a conduit for conducting the inert gas from the generator to the evaporator, a conduit for conducting liquid refrigerant from the condenser to the evaporator, a conduit for conducting mixed vapor of refrigerant and inert gas from the evaporator to the condenser in heat exchange relation with inert gas passing into the evaporator, a conduit for conducting rich absorption liquid from the condenser to the generator by gravity, a conduit for conducting weak absorption liquid from said container to said condenser by gravity, a conduit extending upwardly from said generator to said container and means to heat the last-mentioned conduit to lift liquid from the generator to the container.

2. Refrigerating apparatus comprising a generator, a condenser arranged at a higher level than the generator, an evaporator, a container arranged at a higher level than the condenser, said generator containing an inert gas dissolved in absorption liquid and adapted to expel the inert gas from solution, a conduit for conducting the inert gas from the generator to the evaporator, a conduit for conducting liquid refrigerant from the condenser to the evaporator, a conduit for conducting mixed vapor of refrigerant and inert gas from the evaporator to the condenser in heat exchange relation with inert gas passing into the evaporator, a conduit for conducting rich absorption liquid from the condenser to the generator by gravity, a conduit for conducting weak absorption liquid from said container to said condenser by gravity, a conduit extending upwardly from said generator to said container, means to heat the last-mentioned conduit to lift liquid from the generator to the container and a vent conduit connecting the upper part of said container with said condenser.

3. Refrigerating apparatus comprising a generator, a condenser arranged at a higher level than the generator, an evaporator, a container arranged at a higher level than the condenser, said generator containing ammonia dissolved in water and adapted to expel the ammonia from solution, a conduit for conducting the ammonia gas from the generator to the evaporator, a conduit for conducting liquid butane from the condenser to the evaporator, a conduit for conducting mixed vapor of butane and ammonia from the evaporator to the condenser in heat exchange relation with ammonia gas passing into the evaporator, a conduit for conducting strong solution of ammonia in water from the condenser to the generator by gravity, a conduit for conducting weak solution of ammonia in water from said container to said condenser by gravity, a conduit extending upwardly from said generator to said container and means to heat the last-mentioned conduit to lift liquid from the generator to the container.

4. Refrigerating apparatus comprising a generator, a condenser arranged at a higher level than the generator, an evaporator, a container arranged at a higher level than the condenser, said generator containing ammonia dissolved in water and adapted to expel the ammonia from solution, a conduit for conducting the ammonia gas from the generator to the evaporator, a conduit for conducting liquid butane from the condenser to the evaporator, a conduit for conducting mixed vapor of butane and ammonia from the evaporator to the condenser in heat exchange relation with ammonia gas passing into the evaporator, a conduit for conducting strong solution of ammonia in water from the condenser to the generator by gravity, a conduit for conducting weak solution of ammonia in water from said container to said condenser by gravity, a conduit extending upwardly from said generator to said container, means to heat the last-mentioned conduit to lift liquid from the generator to the container and a vent conduit connecting the upper part of said container with said condenser.

5. Method of refrigerating which comprises evaporating a liquid cooling agent in the presence of an inert gas to absorb heat and thus forming a gaseous mixture of cooling agent and inert gas, conveying the gaseous mixture into the presence of an absorption liquid at such condition that the cooling agent condenses on being deprived of inert gas in gaseous mixture therewith due to the introduction of absorption liquid into the presence of the inert gas, separating the solution of inert gas in absorption medium from the condensed cooling agent, returning the condensed cooling agent to the presence of the inert gas, separating the inert gas and absorption liquid by heat, circulating the absorption liquid by means of a separate ource of heat to the presence of the gaseous mixture of cooling agent and inert gas and returning the inert gas to the presence of the liquid cooling agent.

In testimony whereof we hereunto affix our signatures.

ALBERT EINSTEIN.
LEO SZILARD.